(12) United States Patent
Tojo et al.

(10) Patent No.: US 6,379,774 B1
(45) Date of Patent: *Apr. 30, 2002

(54) COMPOSITE POLYESTER FILM AND MAGNETIC RECORDING MEDIUM

(75) Inventors: Mitsuo Tojo; Toshikazu Uchida; Toshifumi Osawa, all of Sagamihara (JP)

(73) Assignee: Teijin Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,404

(22) Filed: May 20, 1999

(30) Foreign Application Priority Data

May 21, 1998 (JP) ............................................ 10-139782
Sep. 28, 1998 (JP) ............................................ 10-273142

(51) Int. Cl.[7] .......................... B32B 5/02; B32B 27/08; B32B 27/18; B32B 27/30; B32B 27/36
(52) U.S. Cl. ..................... 428/141; 428/323; 428/327; 428/407; 428/447; 428/480; 428/483; 428/900; 428/694 SL; 428/694 SG; 428/694 ST
(58) Field of Search ................... 428/694 SL, 694 SG, 428/694 ST, 141, 323, 447, 480, 483, 327, 407, 900

(56) References Cited

U.S. PATENT DOCUMENTS

| | | | |
|---|---|---|---|
| 4,629,646 A | * 12/1986 | Ide et al. ..................... | 428/143 |
| 4,759,991 A | * 7/1988 | Kanno et al. ................ | 428/447 |
| 4,832,991 A | * 5/1989 | Hayward et al. ......... | 427/393.5 |
| 5,262,492 A | * 11/1993 | Hanada et al. ............... | 525/415 |
| 5,370,930 A | 12/1994 | Ito .............................. | 428/335 |
| 5,637,405 A | 6/1997 | Hara et al. .................. | 428/447 |
| 6,051,308 A | * 4/2000 | Shimomura et al. ........ | 428/323 |

FOREIGN PATENT DOCUMENTS

| | | |
|---|---|---|
| EP | 527 080 | 2/1993 |
| JP | 61-5941 | 1/1986 |
| JP | 10-261215 | 9/1998 |
| JP | 10-261216 | 9/1998 |
| WO | WO 98/49008 | 11/1998 |

* cited by examiner

*Primary Examiner*—Paul Thibodeau
*Assistant Examiner*—Ramsey Zacharia
(74) *Attorney, Agent, or Firm*—Sughrue Mion, PLLC

(57) ABSTRACT

A composite polyester film comprising (1) a base film C of an aromatic polyester which does not contain or contains inert particles having an average particle diameter of 5 to 2,000 nm in an amount of 0.001 to 5.0 wt % based on the aromatic polyester; (2) a coating layer A on one side of the base film C, which comprises a binder resin, inert particles, a surfactant and a siloxane copolymeried acrylic resin, the outer surface of the coating layer A being not a surface for forming a magnetic layer thereon, and the siloxane copolymerized acrylic resin being contained in an amount of 1 to 50 wt % based on the coating layer A; and, (3) a coating layer B on the other side where the coating layer A is not existent of the base file C, which comprises one member selected from the group consisting of a siloxane copolymerized polyester resin, siloxane copolymerized acrylic resin, silicone and wax, a binder resin, inert particles and a surfactant, the outer surface of the coating layer B being a surface for forming a magnetic layer thereon, and the above member being contained in an amount of 5 to 90 wt % based on the coating layer B when the member is a siloxane copolymerized polyester resin or 1 to 50 wt % based on the coating layer B when the member is other than the siloxane copolymerized polyester resin.

13 Claims, No Drawings

COMPOSITE POLYESTER FILM AND MAGNETIC RECORDING MEDIUM

DETAILED DESCRIPTION OF THE INVENTION

The present invention relates to a composite polyester film and to a magnetic recording medium. More specifically, it relates to a composite polyester film whose amount of electrostatic charge is small and which is free from blocking, rarely chipped and suitable for use as a base film for a high-density magnetic recording medium having excellent electromagnetic conversion characteristics, adhesion to a magnetic layer and adhesion to a back coat and to a magnetic recording medium comprising the same as a base film.

A magnetic recording medium such as a video tape, audio tape, memory tape, magnetic sheet or magnetic disk comprises a base film and a magnetic layer formed on the surface of the base film. On a surface opposite to the magnetic layer, a slippery back coat layer is formed in many cases to achieve slipperiness. As the base film of the magnetic recording medium is mainly used a polyester film. The adhesion of the polyester film to the magnetic layer and the adhesion of the polyester film to the slippery back coat layer are important properties. If these adhesion properties are unsatisfactory, the magnetic layer and the back coat layer peel off and magnetic characteristics are completely lost in the sound recording, image recording or reproduction step of the magnetic recording medium.

Polyester films having improved adhesion include one whose surface is subjected to corona discharge, one whose surface is coated with an adhesive resin, and the like. In order to provide a marked adhesion effect, it is said that the surface of a polyester base film is desirably coated with an adhesive resin.

In recent years, along with an increase in magnetic recording density, the surface of a polyester film used has been made less rough and more smooth. In this case, blocking readily occurs when a conventional polyester film coated with an adhesive resin is rolled and the film is easily broken or torn when it is unrolled in the production process of a magnetic medium.

Particularly, in a deposited tape having a magnetic metal thin film formed on the surface of a polyester film by vacuum deposition, such as a deposited video tape, the base film used has a low surface roughness and hence, the slipperiness of the tape traveling surface must be improved by forming a back coat layer on a side opposite to a magnetic side. When the surface of the polyester film is coated with an adhesive resin by a conventional technology to improve the adhesion of the back coat layer to the polyester film, blocking readily occurs because the surface roughness of the base film is extremely low.

It is considered that this blocking is caused by the fact-that moisture contained in the air permeates into the surface of the film or penetrates between the contact surfaces of films and the contact surfaces of the films become a state that they are adhered to each other by pressure between the films. Film rolls after film production or before using to base films are kept at low humidity at a plant. Although it is possible to prevent blocking to a certain degree by strictly controlling storage conditions, there is no radical solution to this problem. Particularly, in the case of a polyester film for a deposited magnetic recording medium, it is impossible to prevent blocking of an adhesive film by the control of humidity alone during storage.

A polyester film which is readily blocked is easily electrified with electricity and a high electrostatic film involves such problems that the handling properties of the film greatly deteriorate at the time of film formation and tape formation, sparks generated by electrostatic charge may ignite an organic solvent used for the formation of a tape, and the film easily adsorbs suspending dust in the air electrically, thereby causing a drop out in a deposited tape and the like which require high-density recording.

JP-A 61-5941 (the term "JP-A" as used herein means an "unexamined published Japanese patent application") discloses an adhesive polyester film for use as a base film for a magnetic metal thin film deposited magnetic recording medium, which comprises a smooth polyester film having an Ra value of 0.002 to 0.030 $\mu$m and a polymer layer formed on both sides of the polyester film, wherein at least one of the polymer layers is essentially composed of an adhesive resin and 0.1 to 30 wt % of silicone based on the adhesive resin and a magnetic layer is formed on the other polymer layer. Polyurethanes, polyester ether copolymers, water-soluble polyester copolymers and polyester copolymers containing a polyethylene glycol-sulfonic acid alkali metal salt are enumerated as the adhesive resin. It is disclosed that the silicone compound usable is a compound having a chain component represented by the following formula:

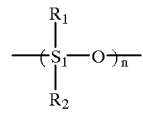

wherein $R_1$ is $CH_3$, $C_6H_5$ or H, $R_2$ is $CH_3$, $C_6H_5$, H or functional group (such as an epoxy group, amino group or hydroxyl group), and n is an integer of 100 to 7,000.

JP-A 10-261215 discloses a polyester film for a magnetic recording medium which comprises a polyester film having a surface A with an SRa value of 2 to 4 nm and an SRz value of 10 to 40 nm and a coating layer formed on the other surface B of the polyester film, the coating layer comprising 20 to 80 wt % of an adhesive polymer prepared by copolymerizing a fluorine compound or a silicon compound and fine particles existent in the coating film and/or on the surface of the coating film, a ferromagnetic metal thin layer being formed on outside of the surface A, and a back coat layer being formed on outside of the coating layer.

JP-A 10-261216 discloses a polyester film for a magnetic recording medium which comprises a polyester film having a surface A with an SRa value of 2 to 4 nm and an SRz value of 10 to 40 nm and a polymer layer essentially composed of an adhesive resin formed on the other surface B of the polyester film, the adhesive resin being prepared by copolymerizing 0.1 to 30 wt % of a fluorine compound or silicon compound, a ferromagnetic metal thin film layer being formed on outside of the surface A and a back coat layer being formed on outside of the polymer layer.

WO98/49008 discloses a low electrostatic composite polyester film which is a composite film comprising a base film C, a coating layer A on one side of the base film C and a coating layer B on the other side of the base film C, wherein (1) the coating layer A is made from a water-soluble resin or water-dispersible resin containing inert particles having an average particle diameter of 5 to 100 nm and has protrusions on the surface at a density of $1\times10^6$ to $1\times10^8/mm^2$ and a center line average surface roughness (Ra-A) of 0.1 to 2 nm;

(2) the coating layer B comprises 1 to 40 wt % of inert particles having an average particle diameter of 20 to 100 nm and 60 to 99 wt % of a water-soluble resin- or water-dispersible resin-containing composition which contains 5 to 85 wt % of a silicone-modified polyester resin or 1 to 30 wt % of silicone or wax based on the layer B; and (3) the base film C is an aromatic polyester film which does not contain inert particles or contains inert particles having an average particle diameter of 5 to 2,000 nm in an amount of 0.001 to 5.0 wt %.

This composite polyester film is used as a base film for producing a magnetic recording medium having a magnetic recording layer on outside of the coating layer A.

It is an object of the present invention to provide a composite polyester film whose amount of electrostatic charge is small and which is free from blocking, rarely chipped and suitable for use as a base film for a high-density magnetic recording medium having excellent electromagnetic conversion characteristics, adhesion to a magnetic layer and adhesion to a back coat.

It is another object of the present invention to provide a composite polyester film having a back coat layer having new composition and the above characteristic properties.

It is a further object of the present invention to provide a composite polyester film having a coating layer having new composition for forming a magnetic layer thereon and the above characteristic properties.

It is a still further object of the present invention to provide a composite polyester film having a back coat layer having new composition, a coating layer for forming a magnetic layer thereon and the above characteristic properties.

It is a still further object of the present invention to provide a magnetic recording medium comprising the above composite polyester film of the present invention as a base film.

Other objects and advantages of the present invention will become apparent from the following description.

According to the present invention, firstly, the above objects and advantages of the present invention are attained by a composite polyester film (may be referred to as "first composite polyester film of the present invention" hereinafter) comprising:

(1) a base film C of an aromatic polyester which does not contain inert particles or contains inert particles having an average particle diameter of 5 to 2,000 nm in an amount of 0.001 to 5.0 wt % based on the aromatic polyester; and (2) a coating layer A on one side of the base film C, which comprises a binder resin, inert particles, a surfactant and a siloxane copolymerized acrylic resin, the outer surface of the coating layer A being not a surface for forming a magnetic layer thereon, and the siloxane copolymerized acrylic resin being contained in an amount of 1 to 50 wt % based on the coating layer A.

Secondly, the above objects and advantages of the present invention are attained by a composite polyester film (may be referred to as "second composite polyester film of the present invention" hereinafter) comprising:

(1) a base film C of an aromatic polyester which does not contain inert particles or contains inert particles having an average particle diameter of 5 to 2,000 nm in an amount of 0.001 to 5.0 wt % based on the aromatic polyester; and (2) a coating layer B on one side of the base film C, which comprises one member selected from the group consisting of a siloxane copolymerized polyester resin, siloxane copolymerized acrylic resin, silicone and wax, a binder resin, inert particles and a surfactant, the outer surface of the coating layer B being a surface for a forming a magnetic layer thereon, and the above member being contained in an amount of 5 to 90 wt % based on the coating layer B when the member is a siloxane copolymerized polyester resin or 1 to 50 wt % based on the coating layer B when the member is other than the siloxane copolymerized polyester resin.

Thirdly, the above objects and advantages of the present invention are attained by a composite polyester film (may be referred to as "third composite polyester film of the present invention" hereinafter) comprising:

(1) a base film C of an aromatic polyester which does not contain inert particles or contains inert particles having an average particle diameter of 5 to 2,000 nm in an amount of 0.001 to 5.0 wt % based on the aromatic polyester;

(2) a coating layer A on one side of the base film C, which comprises a binder resin, inert particles, a surfactant and a siloxane copolymerized acrylic resin, the outer surface of the coating layer A being not a surface for forming a magnetic layer thereon, and the siloxane copolymerized acrylic resin being contained in an amount of 1 to 50 wt % based on the coating layer A; and (3) a coating layer B on the other side of the base film C where the coating layer A is not existent, which comprises one member selected from the group consisting of a siloxane copolymerized polyester resin, siloxane copolymerized acrylic resin, silicone and wax, a binder resin, inert particles and a surfactant, the outer surface of the coating layer B being a surface for forming a magnetic layer thereon, and the above member being contained in an amount of 5 to 90 wt % based on the coating layer B when the member is a siloxane copolymerized polyester resin or 1 to 50 wt % based on the coating layer B when the member is other than the siloxane copolymerized polyester resin.

Further detail description is as follows:

The first composite polyester film of the present invention will first be described hereinafter.

The base film C is made from an aromatic polyester. The aromatic polyester may contain inert particles. When it contains inert particles, it contains 0.001 to 5.0 wt % of inert particles having an average particle diameter of 5 to 2,000 nm.

The aromatic polyester is selected from polyethylene terephthalate, polyethylene isophthalate, polytetramethylene terephthalate, poly-1,4-cyclohexylene dimethylene terephthalate, polyethylene-2,6-naphthalene dicarboxylate and the like. Out of these, polyethylene terephthalate and polyethylene-2,6-naphthalene dicarboxylate are preferred.

The aromatic polyester may be either a homopolyester or a copolyester. In the case of a copolyester, components to be copolymerizable with polyethylene terephthalate and polyethylene-2,6-naphthalene dicarboxylate include diol components such as diethylene glycol, propylene glycol, neopentyl glycol, polyoxyethylene glycol, p-xylene glycol and 1,4-cyclohexanedimethanol; other dicarboxylic acid components such as adipic acid, sebacic acid, phthalic acid, isophthalic acid, terephthalic acid (for polyethylene-2,6-naphthalene dicarboxylate), 2,6-naphthalenedicarboxylic acid (for polyethylene terephthalate) and 5-sodium sulfoisophthalic acid; oxycarboxylic acid components such as p-oxyethoxybenzoic acid; and the like. The amount of the copolymerizable component is 20 mol % or less, preferably 10 mol % or less.

Further, a polyfunctional compound having a functionality of 3 or more, such as trimellitic acid or pyromellitic acid, may be copolymerized. In this case, it is preferably copolymerized in such an amount that the polymer is substantially linear, for example, 2 mol % or less.

The thickness of the base film C is preferably 1 to 20 μm, more preferably 2 to 10 μm.

The base film C in the present invention may or may not contain inert particles as described above. When it contains inert particles, the inert particles may be either organic particles or inorganic particles. The inert particles contained in the base film C may be the same or different from inert particles contained in the coating layer A and the coating layer B which will be described hereinafter in type and average particle diameter. Illustrative examples of the inert particles include core-shell structured organic particles such as polystyrene, polystyrene-divinylbenzene, polymethyl methacrylate, methyl methacrylate copolymer, methyl methacrylate copolymer crosslinked material, polytetrafluoroethylene, polyvinylidene fluoride, polyacrylonitrile, benzoguanamine resin and graft copolymers comprising these polymers; and inorganic particles such as silica, alumina, titanium dioxide, feldspar, kaolin, talc, graphite, calcium carbonate, molybdenum disulfide, carbon black and barium sulfate. These particles are added to a reaction system preferably as a slurry contained in glycol during the production of a polyester, for example, at any time during an ester exchange reaction or polycondensation reaction when it is produced by an ester exchange method, or at any time when it is produced by a direct polymerization method. The average particle diameter of the inert particles is preferably 5 to 2,000 nm, more preferably 10 to 1,800 nm. The amount of the inert particles is 0.001 to 5.0 wt %, preferably 0.001 to 2.0 wt %, more preferably 0.01 to 1.5 wt %.

The volume shape coefficient of the inert particles is preferably 0.1 to π/6, more preferably 0.4 to π/6.

The volume shape coefficient (f) is defined by the following equation.

$$f = V/R^3$$

wherein f is a volume shape coefficient, V is the volume ($\mu m^3$) of the inert particles and R is the average particle diameter ($\mu m$) of the inert particles.

When the coefficient (f) is π/6, the inert particle is globular (spherical). When the coefficient is 0.4 to π/6, the inert particle is substantially globular (spherical) or elliptical like a rugby ball. It is difficult for a particle having a volume shape coefficient (f) of less than 0.1, for example, a flake-like particle to achieve sufficient traveling durability.

The base film C may be a single-layer film or a multi-layer film consisting of aromatic polyester films having different compositions of the each layers.

The first composite polyester film of the present invention has a coating layer A on one side of the base film C. The coating layer A comprises a binder resin, inert particles, a surfactant and a siloxane copolymerized acrylic resin.

Illustrative examples of the binder resin include alkyd resins, phenol resins, epoxy resins, amino resins, polyurethane resins, cellulose resins, vinyl acetate resins, vinyl chloride-vinyl acetate copolymer, acrylic resins, polyester resins and acryl-polyester resins.

Out of these, acrylic resins, polyester resins and acryl-polyester resins which are water-soluble or water-dispersible resins are preferred from the viewpoints of adhesion to a polyester film as a base film, protrusion retention properties and slipperiness. These resins may be either a homopolymer, copolymer or mixture. The content of the binder resin is preferably 20 to 90 wt %.

The above water-soluble and water-dispersible acrylic resins include, for example, acrylic acid esters (residual alcohol groups include a methyl group, ethyl group, n-propyl group, isopropyl group, n-butyl group, isobutyl group, t-butyl group, 2-ethylhexyl group, cyclohexyl group, phenyl group, benzyl group, phenylethyl group and the like); methacrylic acid esters (residual alcohol group are the same as above); hydroxy-containing monomers such as 2-hydroxyethyl acrylate, 2-hydroxyethyl methacrylate, 2-hydroxypropyl acrylate and 2-hydroxypropyl methacrylate; amide group-containing monomers such as acrylamide, methacrylamide, N-methyl methacrylamide, N-methyl acrylamide, N-methylol acrylamide, N-methylol methacrylamide, N,N-dimethylol acrylamide, N-methoxymethyl acrylamide, N-methoxymethyl methacrylamide and N-phenyl acrylamide; amino group-containing monomers such as N,N-diethyl aminoethyl acrylate and N,N-diethyl aminoethyl methacrylate; epoxy group-containing monomers such as glycidyl acrylate, glycidyl methacrylate and allyl glycidyl ether; monomers containing a sulfonic acid group or salt thereof, such as styrenesulfonic acid, vinylsulfonic acid and salts thereof (such as sodium salts, potassium salts and ammonium salts thereof); monomers containing a carboxyl group or salt thereof such as crotonic acid, itaconic acid, acrylic acid, maleic acid, fumaric acid and salts thereof (such as sodium salts, potassium salts and ammonium salts thereof); monomers containing an anhydride such as maleic anhydride and itaconic anhydride; and combinations of monomers such as vinyl isocyanate, allyl isocyanate, styrene, vinyl methyl ether, vinyl ethyl ether, vinyl trisalkoxysilane, alkylmaleic acidmonoester, alkylfumaric acid monoester, acrylonitrile, methacrylonitrile, alkyl itaconic acid monoester, vinylidene chloride, vinyl acetate and vinyl chloride. What contain 50 mol % or more of a (meth)acryl monomer such as an acrylic acid derivative or methacrylic acid derivative are preferred and what contain methyl methacrylate are particularly preferred.

The water-soluble or water-dispersible acrylic resins can be self-crosslinked with a functional group in the molecule or can be crosslinked using a crosslinking agent such as a melamine resin or epoxy compound.

The above water-soluble or water-dispersible polyester resins comprise a polycarboxylic acid and a polyhydroxy compound. Illustrative examples of the polycarboxylic acid include terephthalic acid, isophthalic acid, phthalic acid, 1,4-cyclohexanedicarboxylic acid, 2,6-naphthalenedicarboxylic acid, 4,4'-diphenyldicarboxylic acid, adipic acid, sebacic acid, dodecanedicarboxylic acid, succinic acid, 5-sodium sulfoisophthalic acid, 2-potassium sulfoterephthalic acid, trimellitic acid, trimesic acid, trimellitic anhydride, phthalic anhydride, p-hydroxybenzoic acid, monopotassium trimellitate and the like. Illustrative examples of the polyhydroxyl compound include ethylene glycol, propylene glycol, 1,3-propanediol, 1,4-butanediol, 1,6-hexanediol, neopentyl glycol, 1,4-cyclohexane dimethanol, p-xylylene glycol, adduct of bisphenol A with ethylene oxide, diethylene glycol, triethylene glycol, polyethylene oxide glycol, polytetramethylene oxide glycol, dimethylolpropionic acid, glycerin, trimethylol propane, sodium dimethylol ethyl sulfonate, potassium dimethylol propionate and the like. Polyester resins can be produced from these compounds in accordance with a commonly used method. To produce an water-soluble or water-dispersible polyester resin, an aqueous polyester resin containing a 5-sodium sulfoisophthalic acid component or carboxylate group is preferably used. The polyester resin can be self-crosslinked with a functional group in the molecule or can be crosslinked using a curing agent such as a melamine resin or epoxy resin.

The above water-soluble or water-dispersible acryl-polyester resins comprehend both acryl modified polyester resins and polyester modified acrylic resins in which an acrylic resin component and a polyester resin component are bonded together, such as graft type and block type resins. The acryl-polyester resins can be produced, for example, by adding a radical initiator to both ends of a polyester resin to polymerize an acrylic monomer, by adding a radical initiator to the side chain of a polyester resin to polymerize an acrylic monomer, or by adding a hydroxyl group to the side chain of an acrylic resin to react it with a polyester having an isocyanate group or carboxyl group at a terminal so as to form a comb-like polymer.

The inert particles contained in the coating layer A may be an organic particle such as polystyrene, polystyrene-divinylbenzene, polymethyl methacrylate, methyl methacrylate copolymer, methyl methacrylate crosslinked copolymer, polytetrafluoroethylene, polyvinylidene fluoride, polyacrylonitrile or benzoguanamine resin, or an inorganic particle such as silica, alumina, titanium dioxide, kaolin, talc, graphite, calcium carbonate, feldspar, molybdenum disulfide, carbon black or barium sulfate. A multi-layer structured core-shell type particle whose core and shell are made from materials having different properties may be used.

The inert particles preferably have an average particle diameter of 10 to 200 nm, more preferably 20 to 100 nm. The content of the inert particles in the coating layer A is preferably 5 to 40 wt %, more preferably 5 to 20 wt %. Further, the inert particles preferably have a uniform particle size distribution. When the average particle diameter of the inert particles is smaller than 5 nm or the content thereof is smaller than 5 wt %, winding properties and conveyance properties in the film formation process become unsatisfactory or blocking readily occurs. When the average particle diameter is larger than 200 nm or the content is larger than 40 wt %, the coating layer A is easily chipped.

$Ra^A$ of the outer surface of the coating layer A is preferably 1 to 30 nm, more preferably 2 to 20 nm. When $Ra^A$ is less than 1 nm, winding properties and conveyance properties in the film formation process become unsatisfactory or blocking readily occurs. When $Ra^A$ is more than 30 nm, the coating layer A is easily chipped and shape transfer to the other surface readily occurs at the time of rolling the film. This roughness may be provided by the coating layer A, the polyester film or a combination of the coating layer A and the polyester film.

A siloxane copolymerized acrylic resin is further contained in the coating layer A in an amount of 1 to 50 wt %. The siloxane copolymerized acrylic resin of the present invention is such that a siloxane component and an acrylic resin component are bonded together, and comprehends graft type and block type resins. The copolymer can be produced, for example, by adding a radical initiator to both ends of an acrylic resin to carry out the polymerization of a siloxane or by adding a hydroxyl group to the side chain of a siloxane to react it with an acrylic compound having an isocyanate group or carboxyl group at a terminal to form a comb-like polymer.

The acrylic resin preferably comprises the same monomer components as those enumerated for the acrylic resin used in the coating layer A.

The siloxane component is preferably a polymer having a chain component represented by the following formula:

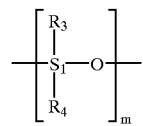

wherein $R_3$ is a hydrogen atom, methyl group or phenyl group, $R_4$ is a hydrogen atom, methyl group, phenyl group or functional group (such as an epoxy group, amino group or hydroxy group), and m is an integer of 100 to 7,000.

Out of these, a polymer having an epoxy group, amino group, hydroxyl group or other functional terminal group at a terminal is preferred. In the present invention, the siloxane compound does not have to be a homopolymer and may be a copolymer or a mixture of several homopolymers.

The weight ratio of the acrylic resin component to the siloxane component is preferably 98:2 to 50:50, more preferably 95:5 to 60:40. The content of the siloxane copolymerized acrylic resin in the coating layer A is preferably 1 to 50 wt %, more preferably 1 to 30 wt %. When the content is smaller than 1 wt %, the effect becomes unsatisfactory, thereby readily causing blocking and an increase in the amount of electrostatic charge. When the content is larger than 50 wt %, adhesion of a back coat deteriorates, transfer to the contact surface occurs at the time of rolling the film, or the contact roll is readily stained at the time of traveling the film.

The surfactant is not particularly limited but preferably a nonionic surfactant, anionic surfactant or cationic surfactant. Out of these, a nonionic surfactant is particularly preferred. The content of the surfactant is preferably 5 to 40 wt %.

A component other than the binder resin, inert particles, surfactant and siloxane copolymerized acrylic resin may be added to the coating layer A in limits that do not influence the present invention. For example, a cellulose-based resin is preferably added to improve slipperiness. The thickness of the coating layer A is preferably 1 to 100 nm, more preferably 2 to 20 nm.

The outer surface of the coating layer A is not a surface for forming a magnetic layer thereon. A magnetic layer is formed on the outer surface of the base film C or the outer surface of an intermediate layer formed on the outer surface of the base film C.

A description is subsequently given of the second composite polyester film of the present invention.

The base film C is identical to the base film C which has been described for the first composite polyester film.

The second composite polyester film of the present invention has a coating layer B on one side of the base film C. The coating film B comprises one member selected from the group consisting of a siloxane copolymerized polyester resin, siloxane copolymerized acrylic resin, silicone and wax, a binder resin, inert particles and a surfactant.

The siloxane copolymerized polyester resin is preferably water-soluble or water-dispersible. The resin can be produced by carrying out the polymerization of a siloxane, by adding a radical initiator to both ends of a polyester resin to carry out the polymerization of a siloxane or by adding a hydroxyl group to the side chain of a siloxane to react it with a polyester having an isocyanate group or carboxyl group at a terminal to form a comb-like polymer. Examples of the polyester resin component used for polymerization are the same resins as those enumerated for the polyester resin used in the coating layer A of the first composite polyester film of the present invention. The siloxane is the same compound having a chain component represented by the above formula 1 or a compound having an epoxy group, amino group, hydroxyl group or other functional terminal group. In the present invention, the silicone compound does not have to be a homopolymer and may be a copolymer or a mixture of several homopolymers. The weight ratio of the polyester resin component to the siloxane component is preferably 98:2 to 60:40, more preferably 95:5 to 80:20.

Examples of the siloxane copolymerized acrylic resin are the same as those enumerated for the siloxane copolymerized acrylic resin which has been described for the coating layer A of the first composite polyester film of the present invention. Examples of the silicone are the same polymers as those enumerated as the siloxane component for the above siloxane copolymerized acrylic resin.

The wax may be petroleum wax, vegetable wax, mineral wax, animal wax, low molecular weight polyolefin or the like and not particularly limited. Examples of the petroleum wax include paraffin wax, microcrystalline wax, oxide wax and the like. Examples of the vegetable wax include candelilla wax, carnauba wax, Japan wax, oricurie wax, cane wax, rosin modified wax and the like.

The content of the siloxane copolymerized acrylic resin, silicone or wax in the coating layer B is 1 to 50 wt %, preferably 1 to 30 wt %. When the content is smaller than 1 wt %, blocking occurs and the amount of electrostatic charge increases and when the content is larger than 50 wt %, adhesion of a magnetic layer degrades or the contact roll is stained at the time of traveling the film. The content of the siloxane copolymerized polyester resin in the coating layer B is 5 to 90 wt %, preferably 20 to 80 wt %. When the content is smaller than 5 wt %, the effect becomes unsatisfactory, thereby causing blocking and an increase in the amount of electrostatic charge and when the content is larger than 90 wt %, adhesion of a magnetic layer degrades or the contact roll is stained at the time of traveling the film.

The coating layer B further contains a binder resin, inert particles and a surfactant. As for what is not described herein for each of the above components, it should be understood that what has been described for the coating layer A of the first composite polyester film of the present invention is applied directly.

The binder resin preferably has a softening point measured in accordance with JIS-K7206 (for a dried binder resin) of 50° C. or more to improve corona treatment blocking resistance. However, the surface of the coating layer B is apt to be roughened according to coating conditions or the like if Tg of the resin of the coating layer B is too high. Accordingly, when a binder resin having a high glass transition temperature Tg is used, it is important not to roughen the surface of the coating layer B by controlling coating conditions in order to prevent that electromagnetic conversion characteristics are deteriorated by the roughened surface. The term "roughness" in this case means square average roughness obtained when a 10 $\mu m^2$ area is measured with a contact surface roughness meter. The roughness is preferably 2.0 nm or less, more preferably 1.8 nm or less, much more preferably 1.5 nm or less.

The inert particles preferably have an average particle diameter of 5 to 100 nm, more preferably 10 to 50 nm. Further, the inert particles preferably have a uniform particle size distribution. When the average particle diameter is smaller than 5 nm, slipperiness and chipping resistance are liable to deteriorate. When the average particle diameter is larger than 100 nm, the particles readily fall off and chipping resistance is apt to degrade. Since spacing between the magnetic head and the film becomes large, it is difficult to provide a high-density magnetic recording medium.

The inert particles are contained in the coating layer B to ensure that the surface protrusion density of the coating layer B should be 1 to 100/$\mu m^2$. When the surface protrusion density is lower than 1/$\mu m^2$, the traveling durability of the resulting magnetic recording medium tends to become unsatisfactory. When the surface protrusion density is higher than 100/$\mu m^2$, electromagnetic conversion characteristics are adversely affected. The surface protrusion density is preferably 2 to 50 /$\mu m^2$, more preferably 3 to 30/$\mu m^2$. The agglomeration rate of the inert particles contained in the coating layer B is preferably 20% or less. When the agglomeration rate is higher than 20%, the particles are easily chipped off or the electromagnetic conversion characteristics of the resulting magnetic recording medium may be adversely affected.

Large protrusions having a height of 4 nm or more calculated from a surface roughness profile obtained by a non-contact 3-D roughness meter are existent on the surface not in contact with the base film C of the coating layer B preferably at a maximum density of 200/mM$^2$ or less, more preferably 100/mm$^2$ or less. Excellent traveling durability can be obtained by the existence of the above protrusions.

The content of the inert particles is preferably 0.5 to 30wt %,particularly preferably 1 to 20wt %. The thickness of the coating layer B is preferably 1 to 100 nm, more preferably 2 to 20 nm.

Ra$^B$ of the outer surface of the coating layer B is preferably 0.1 to 2 nm, more preferably 0.5 to 1.5 nm. When Ra$^B$ is more than 2 nm, the electromagnetic conversion characteristics of the resulting metal thin film magnetic recording medium may degrade and when Ra$^B$ is smaller than 0.1 nm, slipperiness may markedly deteriorate, traveling durability may become unsatisfactory, and the film may stick to the magnetic head, making sound from the tape. Therefore, the tape may not be able to be put to practical use.

The surfactant is preferably used in the coating layer B in an amount of 10 to 50 wt %, more preferably 12 to 40 wt %, particularly preferably 15 to 30 wt %. When the amount of the surfactant is smaller than 10 wt % (based on the total solid content), defects such as cissing are apt to occur at the time of coating and when the amount is larger than 50 wt %, stripe coating defects are formed by foaming. The surfactant preferably has a softening point measured by JIS-K7206 (for a dried surfactant) of 30° C. or more to improve corona treatment blocking resistance.

The surfactant is preferably a nonionic surfactant, particularly preferably a surfactant prepared by adding or binding (poly)ethylene oxide to an alkyl alcohol, alkyl phenyl alcohol or higher fatty acid.

Illustrative examples of the nonionic surfactant include polyoxyethylene alkylphenyl ether-based compounds such as Nonion NS-230, NS-240, HS-220 and HS-240 of NOF Corporation, Nonipole 200, Nonipole 400, Nonipole 500 and Octapole 400 of Sanyo Chemical Industries, Ltd., polyoxyethylene alkylether-based compounds such as Nonion E-230, K-220 and K-230 of NOF Corporation, polyoxyethylene ester-based compounds of higher fatty acids such as Nonion S-15.4 and S-40 of NOF Corporation and the like.

A surfactant other than the above may be used in combination in an amount of less than 10 wt % (based on the total solid content) to reduce the surface tension of a coating solution in order to prevent the generation of uncoated portions when the coating solution for the coating layer B is applied.

The coating layer B preferably has properties to ensure that peel strength between its outer surface and the corona treated exposed surface of the base film C should be 15 g/10 cm or less. When this peel strength is higher than 15 g/10 cm, the film is easily broken by blocking at the time of use. This peel strength is preferably 10 g/10 cm or less.

The thickness of the coating layer B is preferably 1 to 100 nm, more preferably 2 to 50 nm, much more preferably 3 to 10 nm, particularly preferably 3 to 8 nm.

The outer surface of the coating layer B is a surface for forming a magnetic layer thereon.

Finally, the third composite polyester film of the present invention will be described hereinafter.

The third composite polyester film comprises the base film C, the coating layer B and the coating layer A.

As for what is not described herein for the base film C and the coating layer A, it should be understood that what has been described for the first composite polyester film is directly applied. As for what is not described herein for the coating layer B, it should be understood that what has been described for the second composite polyester film is directly applied.

The total thickness of the third composite polyester film is preferably 2.5 to 20 µm, more preferably 3.0 to 10 µm, much more preferably 4.0 to 10 µm. The thickness of the coating layer A is preferably 1 to 100 nm, more preferably 2 to 20 nm. The thickness of the coating layer B is preferably 1 to 100 nm, more preferably 2 to 50 nm, much more preferably 3 to 10 nm, particularly preferably 3 to 8 nm.

A description which is applied to all of the first, second and third composite polyester films of the present invention will be given below.

The base film C of the present invention can be produced by conventionally known methods.

For example, when the polyester film is a single-layer film, the above polyester resin is extruded into a film from a die at a temperature of Tm to (Tm+70)° C. (Tm: melting point of polyester) and solidified by quenching at 40 to 90° C. to obtain an unstretched film. Thereafter, the unstretched film is stretched to 2.5 to 8.0 times, preferably 3.0 to 7.5 times, uniaxially (longitudinal or transverse direction) at a temperature of (Tg−10) to (Tg+70)° C. (Tg: glass transition temperature of polyester), a coating solution for forming the coating layer A and/or the coating layer B is then applied to both surfaces of the film, the film is stretched to 2.5 to 8.0 times, preferably 3.0 to 7.5 times in a direction perpendicular to the above direction at a temperature of Tg to (Tg+70)° C. The film may be stretched again in a longitudinal direction and/or transverse direction as required.

That is, 2-stage, 3-stage, 4-stage or multi-stage stretching may be carried out. The total draw ratio is generally 9 times or more, preferably 12 to 35 times, more preferably 15 to 32 times in terms of area draw ratio. Subsequently, the obtained biaxially oriented film is heat set and crystallized at a temperature of (Tg+70) to (Tm−10)° C., for example, 180 to 250° C. to provide excellent dimensional stability. The heat setting time is preferably 1 to 60 sec.

In the above method, the coating solution for the coating layers A and B is applied to the surface of the polyester base film C before final stretching. After coating, the film is preferably stretched at least uniaxially. The coating film is dried before or during this stretching. Coating is preferably carried out on an unstretched laminate film or uniaxially (longitudinal direction) stretched laminate film, particularly preferably on an uniaxially (longitudinal direction) stretched laminate film. Coating is not particularly limited but may be roll coating, die coating or the like.

The solid content of the above coating solution, particularly aqueous coating solution, is preferably 0.2 to 8 wt %, more preferably 0.3 to 6 wt %, particularly preferably 0.5 to 4 wt %. This coating solution (preferably aqueous coating solution) may contain other components such as other surfactant, a stabilizer, dispersant, U absorber, thickener and the like in limits that do not impair the effect of the present invention.

In the present invention, to improve the characteristic properties such as head touch and traveling durability of the resulting magnetic recording medium and reduce the thickness of the medium at the same time, the Young's moduli in longitudinal and transverse directions of the composite film are preferably controlled to 450 kg/mm$^2$ or more and 600 kg/mm$^2$ or more, more preferably 480 kg/mm$^2$ or more and 680 kg/mm$^2$ or more, much more preferably 550 kg/mm$^2$ or more and 800 kg/mm or more, particularly preferably 550 kg/mm$^2$ or more and 1,000 kg/mm$^2$ or more, respectively. When the base film C is a polyethylene terephthalate layer, the crystallinity of the layer is preferably 30 to 50% and when the base film C is a polyethylene-2,6-naphthalene dicarboxylate layer, the crystallinity is preferably 28 to 38%. When the crystallinity falls below the above lower limits, thermal shrinkage tends to grow and when the crystallinity exceeds the above upper limits, the abrasion resistance of the film is apt to deteriorate and white powders are readily produced by sliding contact between the film and the surface of the roll or the guide pin.

According to the present invention, there is also provided a magnetic recording medium which comprises the composite film of the present invention as a base film, that is, a magnetic recording medium which comprises a magnetic layer formed on the base film C of the first composite film of the present invention or the coating layer B of the second or third composite film of the present invention.

The magnetic recording medium is produced using the composite film of the present invention as follows.

A deposited magnetic recording medium for high-density recording which has excellent electromagnetic conversion characteristics such as output at a short-wavelength range, S/N and C/N, few drop outs and a small error rate can be obtained by forming a ferromagnetic metal thin film layer made from iron, cobalt, chromium or an alloy or oxide essentially composed thereof on the surface of the base film C of the first composite film or the coating layer B of the second or third composite film by vacuum deposition, sputtering, ion plating or the like, a protective layer made from diamond-like carbon (DLC) and a fluorine-containing carboxylic acid-based lubricant layer on the surface of the ferromagnetic metal thin film layer according to purpose or application, or as required, and a known back coat layer on a surface opposite to the magnetic layer as required. This deposited magnetic recording medium is extremely useful as a tape medium for Hi8 for analog signal recording, and digital video cassette recorder (DVC), data 8 mm and DDSIV for digital signal recording.

A metal coated magnetic recording medium for high-density recording which has excellent electromagnetic conversion characteristics such as output at a short-wavelength range, S/N and C/N, few drop outs and a small error rate can be obtained by uniformly dispersing iron or needle-like magnetic fine powders (metal powder) essentially composed of iron into a binder such as polyvinyl chloride or vinyl chloride-vinyl acetate copolymer, applying the obtained binder to the surface of the base film C of the first composite film of the present invention or the coating layer B of the second or third composite film of the present invention to ensure that the thickness of a magnetic layer should be 1 µm or less, preferably 0.1 to 1 µm, and further forming a back coat layer on a surface opposite to the magnetic layer as required by a known method. A non-magnetic layer containing titanium oxide fine particles may be dispersed into the same organic binder as that for the magnetic layer and be formed on the base film C as a primary coat for the metal power containing magnetic layer as required. This metal coated magnetic recording medium is extremely useful as a tape medium for 8 mm video, Hi8, β-cam SP and W-VHS for analog signal recording and digital video cassette recorder (DVC), data 8 mm, DDSIV, digital β-cam, D2, D3 and SX and the like for digital signal recording.

Further, a coated magnetic recording medium for high-density recording which has excellent electromagnetic conversion characteristics such as output at a short-wavelength range, S/N and C/N, few drop outs and a small error rate can be obtained by uniformly dispersing needle-like magnetic fine powders such as iron oxide or chromium oxide or lamellar magnetic fine powders such as barium ferrite into a binder such as polyvinyl chloride or vinyl chloride-vinyl acetate copolymer, applying the obtained binder to the surface of the base film C of the first composite film of the present invention or the coating layer B of the second or third composite film of the present invention to ensure that the thickness of a magnetic layer should be 1 μm or less, preferably 0.1 to 1 μm and further forming a back coat layer on a surface opposite to the magnetic layer as required by a known method. A non-magnetic layer containing titanium oxide fine particles may be dispersed into the same organic binder as that for the magnetic layer and be formed on the base film C as a primary coat for the magnetic power containing magnetic layer as required. This oxide coated magnetic recording medium is useful as a high-density oxide coated magnetic recording medium for data streamer QIC for digital signal recording.

The above W-VHS is an VTR for analog HDTV signal recording and DVC can be used to record digital HDTV signals. It can be said that the film of the present invention is extremely useful as a base film for a magnetic recording medium for VTRs applying to HDTV.

The following examples are given to further illustrate the present invention. In Examples 1 to 3 and Comparative Examples 1 to 7, the following measurement methods (1) to (10) were used.

(1) Average Particle Diameter of Particles (average particle diameter: 0.06 μm or more)

This is measured using the CP-50 Centrifugal Particle Size Analyzer of Shimadzu Corporation. A particle diameter, "equivalent spherical diameter" equivalent to 50 mass percent, is read from a cumulative curve of the particles of each diameter and the amount thereof calculated based on the obtained centrifugal sedimentation curve and taken as the above average particle diameter (refer to "Particle Size Measurement Technology" issued by Nikkan Kogyo Press, pp. 242–247, 1975).

(2) Average Particle Diameter of Super Fine Particles (average particle diameter: less than 0.06 μm)

Particles having an average particle diameter smaller than 0.06 μm which form small protrusions are measured by a light scattering method. That is, the average particle diameter of the particles is expressed by the "equivalent spherical diameter" of the particles which account for 50 wt % of the total of all particles obtained by the NICOMP MODEL 270 SUBMICRON PARTICLES SIZER of Nicomp Instruments Inc.

(3) Surface Roughness of Film (center line average roughness: Ra)

The center line average roughness (Ra) is measured in accordance with JIS-B601. In the present invention, a probe type surface roughness meter (SURFCORDER SE,30C) of Kosaka Kenkyusho Co., Ltd. is used to measure it under the following conditions.

(a) radius of tip of probe: 2 μm (b) measurement pressure: 30 mg (c) cut off: 0.08 mm (d) measurement length: 8.0 mm (e) collection of data: The surface roughness of a single sample is measured 6 times, and five measurement values excluding the largest value are used to obtain an average value as a center line average roughness (Ra).

(4) Number of Particle Protrusions

Using a SEM (the T-300 scanning electron microscope of JEOL Corp.), 20 photos of the surface of a laminate film are taken at a magnification of 30,000× at an angle of 0° to count the number of granular protrusions and an average value thereof is calculated as the number of protrusions per 1 mm$^2$.

(5) Agglomeration Rate of Particles

The number of protrusions A is counted from 20 photos taken in (4) when each of the particles forming a protrusion is an agglomerate of two or more particles and the agglomeration rate is calculated from (number of protrusions A derived from agglomerates)/(number of all protrusions derived from particles)×100 (%).

(6) Layer Thickness

The total thickness of a film is measured at 10 random locations of the film by a micrometer and the average value of the measurement values is taken as the total thickness of the film. The thickness of a thin layer is measured by the following method while the thickness of a thick layer is obtained by subtracting the thickness of the thin layer from the total thickness. That is, using a secondary ion mass spectrometer (SIMS), the concentration ratio ($M^+/C^+$) of an element derived from particles having the highest concentration out of the particles contained in an area of the film from the surface layer to a depth of 5,000 nm to the carbon element of a polyester is taken as a particle concentration, and a portion from the surface up to a depth of 5,000 nm is analyzed in the thickness direction. The particle concentration is low in the surface layer but becomes higher as the distance from the surface increases. In the case of the present invention, there are two cases. That is, one is a case where after the particle concentration becomes a stable value 1, it increases or decreases to a stable value 2, and the other is a case where after the particle concentration becomes a stable value 1, it decreases continuously. Based on this distribution curve, in the former case, a depth which provides a particle concentration of (stable value 1+stable value 2)/2 is taken as the thickness of the layer whereas, in the latter case, a depth that provides a particle concentration of one-half of the stable value 1 (deeper than the depth that gives a stable value 1) is taken as the thickness of the layer.

The measurement conditions of a secondary ion mass spectrometer (SIMS: 6300 of PERKIN ELMER Co., Ltd.) are as follows.

species of primary ion: $O^{2+}$ primary ion acceleration voltage: 12 kV primary ion current: 200 mA luster area: 400 μm ☐ analysis area: gate 30% measurement degree of vacuum: $6.0 \times 10^{-9}$ Torr

E-GUNN: 0.5 kV–3.0 A

In the case where most of the particles contained in an area of from the surface layer to a depth of 5,000 nm are organic polymer particles other than a silicone resin, it is difficult to measure them with SIMS. Therefore, a concentration distribution curve similar to the above is measured by FT-IR (Fourier transform infrared spectrometry) or XPS (X-ray photo-electron spectrometry) depending on a parallel to obtain the thickness of the layer while the film is etched little by little from the surface.

The above measurement method is very effective in the case of a coextruded layer. In the case of a coating layer, a piece of a film is fixed with an epoxy resin and molded to prepare a very thin piece having a thickness of about 60 nm with a microtome (by cutting the film in parallel with a flow direction). This sample is observed by a transmission electron microscope (H-800 of Hitachi$_1$ Ltd.) to obtain the thickness of the layer from the interface of the layer.

(7) Electrostatic Properties

A polyester film (500 mm in width×3,000 m in length) is rewound at a speed of 150 m/min at 23° C. and 75%RH and the amount of electrostatic charge generated on reviewing of the roll is measured using the Model-203 digital test electric measuring instrument of Hugle Electronics Co., Ltd.

○: less than 2.5 kV

Δ: 2.5 to less than 5.0 kV

X: 5.0 kV or more (8) Blocking

Tow films are superposed in such a manner that a treated surface of one film and an untreated surface of the other film come into contact with each other, a pressure of 150 kg/cm$^2$ is applied to the resulting laminate at 60° C. and 80%RH for 65 hours, these films are separated from each other, and blocking resistance is evaluated based on peel strength (g per 5 cm).

Evaluation is made from peel strength based on the following criteria.

○: 0 to less than 10 g/cm

Δ: 10 to less than 15 g/cm

X: 15 g/cm or more to break (9) Chipping Resistance

A film is cut to a length of 25 to 30 cm and a width of ½ inch, the edge of a razor blade is applied to the coating layer of the film at an angle of 90° and a depth of 0.5 mm, and the width in a depth direction of chippings adhered to the razor blade is obtained from photomicrography (magnification of 160×) when the film is caused to run at a speed of 6.7 cm/sec under a load of 500 g/0 .5 inch. Chipping resistance is evaluated according to the width in a depth direction of chippings. The smaller the width in a depth direction of the chippings the higher the chipping resistance becomes.

○: less than 3 nm

Δ: 3 nm to less than 5 nm

X: 5 nm or more

(10) Production of Magnetic Tape and Evaluation of Characteristic Properties

Two 10% cobalt ferromagnetic thin film layers are formed on the surface of the coating layer B of a laminate film to a total thickness of 0.02 μm (each layer has a thickness of about 0.1 μm) by a vapor deposition method. A diamond-like carbon (DLC) film layer and a fluorine-containing carboxylic acid-based lubricant layer are formed sequentially on the surface of the thin film layers, and a back coat layer having the following composition is further formed on the surface of the coating layer B and dried.

The thickness of the back coat layer after drying is 0.8 μm. composition of back coat layer:

| | |
|---|---|
| carbon black | 100 parts by weight |
| thermoplastic polyurethane | 60 parts by weight |
| isocyanate compound | 18 parts by weight |
| (Colonate L of Nippon Polyurethane Kogyo Co., Ltd.) | |
| silicone oil | 0.5 part by weight |
| methyl ethyl ketone | 250 parts by weight |

Thereafter, the film is slit to a width of 8 mm and loaded into a trade8 mm video cassette. The following trade devices are used to measure the characteristic properties of the tape. used device:

8 mm video tape recorder: EDV-6000 of Sony Corporation

C/N measurement: noise meter of Shibasoku Co., Ltd.

① C/N measurement

A signal having a recording wavelength of 0.5 μm (frequency of about 7.4 MHz) is recorded on a tape, and the ratio of 6.4 MHz and 7.4 MHz values of its reproduction signal is taken as a relative value of C/N of the tape when C/N of a commercial 8 mm video deposited tape is 0 dB.

○: more than 0 dB

Δ: −3 to 0 dB

X: less than −3 dB

② traveling durability

C/N of a tape is measured after recording and reproduction are repeated 500 times at a traveling speed of 85 cm/min and at 40° C. and 80%RH and the traveling durability of the tape is judged based on a deviation from the initial value.

○: +0.0 dB or more from initial value

Δ: −1.0 to less than +0.0 dB from initial value

X: less than −1.0 dB from initial value

③ adhesion of magnetic layer

Scotch Tape No. 600 (of 3M Co., Ltd.) is affixed to a magnetic layer which has been cross cut into 2 mm square pieces in such a manner that an air bubble is not included between them, the tape is rolled by a manual load roll specified in JIS C. 2701 (1975), a 5 cm laminated portion of this sample is peeled in the perpendicular direction at a head speed of 100 mm/min using the UM-11 Tensilon of Toyo Baldwin Co., Ltd., and the adhesion of the magnetic layer is obtained from (number of peeled cross-cutting magnetic layer pieces)/(total number of cross-cutting magnetic layer pieces)×100 (%).

○: to less than 3%

Δ: 3 to less than 10%

X: 10% or more

④ adhesion of back coat

Scotch Tape No. 600 (of 3M Co., Ltd.) having a width of 19.4 mm and a length of 8 cm is affixed to a back coat in such a manner that an air bubble is not included between them, the tape is rolled by a manual load roll specified in JIS. C2701 (1975), a 5 cm laminated portion of this sample is peeled in the perpendicular direction at a head speed of 300 mm/min using the UM-11 Tensilon of Toyo Baldwin Co., Ltd., and the peel strength at this point is obtained and divided by the width of the tape to obtain the adhesion of the back coat in unit of g/cm. In the peeling in the perpendicular direction, the laminate is separated with the tape facing down at a chuck interval of 5 cm.

The adhesion of the back coat is evaluated from peel strength based on the following criteria.

○: 50 g/cm² or more

Δ: 20 g/cm² or more to less than 50 g/cm²

X: less than 20 g/cm²

(11) Deaeration Index 40 films are first placed one upon another using the Beck smoothness tester of Toyo Seiki Co., Ltd., a 5 mm-diameter hole is formed in 39 films excluding the topmost film, and this set of films is set on a sample table. The center of the hole is located at the center of the sample table. In this state, a load of 0.5 kg/cm² is applied to the set of films and the ultimate vacuum is set to 550 mmHg. After 550 mmHg is reached, air flows into the gaps between the films because the pressure tends to return to normal level. At this point, the falling vacuum degree (mmHg) is measured at intervals of 30 sec for 1 hour and the inclination (=mmHg/hr) of a straight line approximating the degree of vacuum with respect to the measurement time (hr) is taken as deaeration index G.

(12) Peel Strength After Corona Treatment

A 100 mm long, 200 mm wide rectangular sample is cut away from a rolled film and the base film C of the sample is subjected to a corona treatment at a temperature of 25° C.±5° C. and a humidity of 50%±5%.

The treatment is carried out under the following conditions using the CG-102 high-frequency power source of Kasuga Denki Co., Ltd.

current: 4.5 A distance between electrodes: 1.0 mm treatment time: passing between electrodes at a speed of 1.2 m/min After the treated film is contacted to the surface opposite to the base film C of the sample and aged for 17 hours at a pressure of 100 kg/cm², a temperature of 60° C. and a humidity of 80%, peel strength per 100 mm in width under tension is obtained.

Example 1

Dimethyl 2,6-naphthalene dicarboxylate and ethylene glycol were polymerized in the presence of manganese acetate as an ester exchange catalyst, antimony trioxide as a polymerization catalyst and phosphorous acid as a stabilizer in accordance with a commonly used method to give polyethylene-2,6-naphthalate (PEN) containing substantially no inert particles.

This polyethylene-2,6-naphthalate was dried at 170° C. for 6 hours, supplied to an extruder, molten at a temperature of 280 to 300° C., extruded into a sheet from a die and quenched to give a μm-thick unstretched film.

The obtained unstretched film was preheated, stretched to 3.5 times in a longitudinal direction between high-speed and low-speed rolls at a film temperature of 95° C. and quenched. A water-soluble coating solution for the coating layer B shown in Table 1 was applied to one side of this stretched film to a thickness of 0.009 μm (after stretching and drying) and a water-soluble coating solution for the coating layer A was applied to the other side of the film to a thickness of 0.035 μm. Thereafter, the film was supplied to a stenter to be stretched to 5.6 times in a transverse direction at 150° C. The obtained biaxially oriented film was heat set with hot air heated at 200° C. for 4 sec to give a 4.9 μm-thick biaxially oriented polyester film.

| ① coating layer A | |
|---|---|
| binder resin | |
| SH551A acryl modified polyester of Takamatsu Yushi Co., Ltd. | 43.3 parts |
| SM15 methyl cellulose of Shin-Etsu Chemical Co., Ltd. | 21.7 parts |
| siloxane copolymerized acrylic resin X-22-8053 of Shin-Etsu Chemical Co., Ltd. | 5 parts |
| inert particles acryl particles (average particle diameter of 40 nm) | 10 parts |
| surfactant Nonion NS-240 of NOF Corporation | 20 parts |
| ② coating layer B | |
| binder resin IN-170-6 acryl modified polyester of Takamatsu Yushi Co., Ltd. | 70 parts |
| inert particles acryl particles (average particle diameter of 40 nm) | 10 parts |
| surfactant Nonion NS-240 of NOF Corporation | 20 parts |

Comparative Examples 1, 2 and 7

Polyester films were obtained in the same manner as in Example 1 except that the compositions of the coating layer A and the coating layer B were changed as shown in Table 1.

Example 2 and Comparative Example 3 to 6

Dimethyl terephthalate and ethylene glycol were polymerized in the presence of manganese acetate as an ester exchange catalyst, antimony trioxide as a polymerization catalyst and phosphorous acid as a stabilizer in accordance with a commonly used method to give polyethylene terephthalate (PET) containing substantially no inert particles.

This polyethylene terephthalate was dried at 170° C. for 3 hours, supplied to an extruder, molten at a temperature of 280 to 300° C., extruded into a sheet from a die and quenched to give a 82 μm-thick unstretched film.

The obtained unstretched film was preheated, stretched to 3.2 times in a longitudinal direction between high-speed and low-speed rolls at a film temperature of 95° C. and quenched. A water-soluble coating solution for the coating layer B was applied to one side of this stretched film to a thickness of 0.009 μm (after stretching and drying) and a water-soluble coating solution for the coating layer A was applied to the other side of the film to a thickness of 0.035 μm. Thereafter, the film was supplied to a stenter to be stretched to 4.1 times in a transverse direction at 110° C. The obtained biaxially oriented film was heat set with hot air heated at 220° C. for 4 sec to give a 6.0 μm-thick biaxially oriented polyester film.

Example 3

A polyester film was obtained in the same manner as in Example 1 except that polyethylene-2,6-naphthalate containing substantially no inert particles and polyethylene-2,6-naphthalate containing 0.2 wt % of silica particles having an average particle diameter of 200 nm were dried at 170° C. for 6 hours, molten at 310° C. using two extruders and laminated together using a multi-manifold coextrusion die to ensure that the thickness ratio of polyethylene-2,6-naphthalate containing no particles to polyethylene-2,6-naphthalate containing particles should be 2:1, and the coating layer A shown in Table 1 was formed on the particle-containing layer and the coating layer B was formed on the other side.

As is obvious from Table 1 and Table 2, the composite polyester films of the present invention have a small amount of electrostatic charge, are free from blocking and rarely chipped and have excellent electromagnetic conversion characteristics, adhesion to a magnetic layer and adhesion to a back coat. In contrast to this, composite polyester films which do not meet the requirements of the present invention do not achieve the above characteristic properties at the same time.

TABLE 1

| | coating layer B | | | | | |
|---|---|---|---|---|---|---|
| | siloxane copolymerized acrylic resin | | other | inert particles | | |
| | type | content (wt %) | resin type | material | average particle diameter (nm) | base film |
| Ex. 1 | — | — | a | acrylic copolymer | 40 | ① |
| Ex. 2 | e | 3 | a | acrylic copolymer | 40 | ② |
| Ex. 3 | — | — | a | silica | 25 | ③ |
| C. Ex. 1 | — | — | a | acrylic copolymer | 40 | ① |
| C. Ex. 2 | e | 60 | a | acrylic copolymer | 40 | ① |
| C. Ex. 3 | — | — | b | silica | 25 | ② |
| C. Ex. 4 | — | — | a | acrylic copolymer | 40 | ② |
| C. Ex. 5 | — | — | b | silica | 25 | ② |
| C. Ex. 6 | — | — | b | silica | 20 | ② |
| C. Ex. 7 | — | — | a | acrylic copolymer | 40 | ① |

| | coating layer A | | | | | |
|---|---|---|---|---|---|---|
| | siloxane copolymerized acrylic resin | | other | inert particles | | |
| | type | content (wt %) | resin type | material | average particle diameter (nm) | content (wt %) |
| Ex. 1 | e | 5 | d | acrylic copolymer | 40 | 10 |
| Ex. 2 | e | 10 | d | acrylic copolymer | 40 | 10 |
| Ex. 3 | f | 25 | c | silica | 30 | 20 |
| C. Ex. 1 | — | — | d | acrylic copolymer | 40 | 10 |
| C. Ex. 2 | e | 5 | d | acrylic copolymer | 40 | 10 |
| C. Ex. 3 | f | 70 | d | acrylic copolymer | 40 | 10 |
| C. Ex. 4 | e | 20 | d | — | | |
| C. Ex. 5 | f | 10 | d | acrylic copolymer | 40 | 10 |
| C. Ex. 6 | f | 10 | d | acrylic copolymer | 40 | 10 |
| C. Ex. 7 | e | 5 | d | silica | 300 | 5 |

Ex.: Example
C. Ex.: Comparative Example (Notes) type of resin of coating layer
- a; acrylmodified polyester (IN-170-6 of Takamatsu Yushi Co., Ltd.)
- b; copolyester (2,6-naphthalenedicarboxylic acid/ isophthalic acid/5-sodium sulfoisophthalic acid/ ethylene glycol/adduct of bisphenol A with two moles of propylene oxide)
- c; acryl modified polyester (SH551a of Takamatsu Yushi Co., Ltd.)
- d; acryl modified polyester SH551A/methyl cellulose (SM15 of Shin-Etsu Chemical Co., Ltd.)=2/1
- e; siloxane copolymerized acryl (X-22-8053 of Shin-Etsu Chemical Co., Ltd.)
- f; siloxane copolymerized acryl (X-22-8053EM of Shin-Etsu Chemical Co., Ltd.) base film
  ① single-layer PEN
  ② single-layer PET
  ③ double-layer coextruded PEN

TABLE 2

| | coating layer B | | | $Ra^A$ of coating layer A (nm) |
|---|---|---|---|---|
| | agglomeration rate (%) | density of protrusions (unit: $10^6/mm^2$) | $Ra^B$ (nm) | |
| Ex. 1 | 8 | 20 | 0.7 | 2.5 |
| Ex. 2 | 12 | 21 | 0.8 | 2.3 |
| Ex. 3 | 18 | 8 | 0.6 | 5.7 |

TABLE 2-continued

| C. Ex. 1 | 10 | 20 | 0.7 | 2.4 |
|---|---|---|---|---|
| C. Ex. 2 | 9 | 21 | 0.8 | 2.7 |
| C. Ex. 3 | 15 | 32 | 0.9 | 2.6 |
| C. Ex. 4 | 10 | 10 | 0.6 | 1.9 |
| C. Ex. 5 | 13 | 0.5 | 0.6 | 2.5 |
| C. Ex. 6 | 40 | 130 | 1.5 | 2.5 |
| C. Ex. 7 | 11 | 18 | 0.8 | 4 |

| | characteristic properties of film | | | |
|---|---|---|---|---|
| | electrostatic properties | blocking | chipping resistance of coating layer B | chipping resistance of coating layer A |
| Ex. 1 | ○ | ○ | ○ | ○ |
| Ex. 2 | ○ | ○ | ○ | ○ |

TABLE 2-continued

| | | | | |
|---|---|---|---|---|
| Ex. 3 | ○ | ○ | ○ | ○ |
| C. Ex. 1 | x | x | ○ | ○ |
| C. Ex. 2 | ○ | ○ | x | ○ |
| C. Ex. 3 | ○ | ○ | ○ | ○ |
| C. Ex. 4 | ○ | x | ○ | ○ |
| C. Ex. 5 | ○ | ○ | ○ | ○ |
| C. Ex. 6 | ○ | ○ | x | ○ |
| C. Ex. 7 | ○ | ○ | ○ | x |

| | characteristic properties of magnetic recording medium | | | |
|---|---|---|---|---|
| | electromagnetic conversion characteristics C/N | traveling durability | adhesion of magnetic layer | adhesion of back coat |
| Ex. 1 | ○ | ○ | ○ | ○ |
| Ex. 2 | ○ | ○ | ○ | ○ |
| Ex. 3 | ○ | ○ | ○ | ○ |
| C. Ex. 1 | ○ | ○ | ○ | ○ |
| C. Ex. 2 | x | ○ | x | ○ |
| C. Ex. 3 | ○ | ○ | ○ | x |
| C. Ex. 4 | ○ | ○ | ○ | ○ |
| C. Ex. 5 | ○ | x | ○ | ○ |
| C. Ex. 6 | x | ○ | ○ | ○ |
| C. Ex. 7 | ○ | ○ | ○ | ○ |

Ex.: Example
C. Ex.: Comparative Example

What is claimed is:

1. A composite polyester film comprising:

(1) a base film C of an aromatic polyester which does not contain inert particles or contains inert particles having an average particle diameter of 5 to 2,000 nm in an amount of 0.001 to 5.0 wt % based on the aromatic polyester; and (2) a coating layer A on one side of the base film C, which comprises a binder resin, inert particles having an average particle diameter of 5 to 200 nm, a non-ionic surfactant and a siloxane copolymerized acrylic resin, the outer surface of the coating layer A having a centerline average roughness $Ra^A$ of 1 to 20 nm and being not a surface for forming a magnetic layer thereon, and the inert particles are selected from the group consisting of core-shell structured organic particles of polystyrene, polystyrene-divinylbenzene, polymethyl methacrylate, methyl methacrylate copolymer, methyl methacrylate copolymer crosslinked material, polytetrafluoroethylene, polyvinylidene fluoride, polyacrylonitrile, benzoguanamine resin and graft copolymers comprising these polymers, and contained in an amount of 5 to 40 wt % based on the coating layer A and the siloxane copolymerized acrylic resin being contained in an amount of 1 to 50 wt % based on the coating layer A, and the non-ionic surfactant is contained in an amount of 5 to 40 wt % based on the coating layer A.

2. The composite polyester film of claim 1, wherein the binder resin contained in the coating layer A is at least one water-soluble or water-dispersible resin selected from the group consisting of water-soluble or water-dispersible acrylic resins, polyester resins and acryl-polyester resins.

3. A base film for a magnetic recording medium, which comprises the composite polyester film of claim 1.

4. A magnetic recording medium comprising the composite polyester film of claim 1 and a magnetic recording layer on the surface where the coating layer A of the composite polyester is not existent on the base film C.

5. A composite polyester film comprising:

(1) a base film C of an aromatic polyester which does not contain inert particles or contains inert particles having an average particle diameter of 5 to 2,000 nm in an amount of 0.001 to 5.0 wt % based on the aromatic polyester; and (2) a coating layer B on one side of the base film C, which comprises a binder resin, inert particles having an average particle diameter of 5 to 100 nm and an agglomeration rate of 20% or less, a non-ionic surfactant, and one member selected from the group consisting of a siloxane copolymerized polyester resin, siloxane copolymerized acrylic resin, silicone and wax, the outer surface of the coating layer B having a protrusion density of 1 to $100/\mu m^2$ and a centerline average roughness $Ra^B$ of 0.1 to 2 nm and being a surface for forming a magnetic layer thereon, the non-ionic surfactant being contained in an amount of 10 to 50 wt % based on the coating layer B and the above member being contained in an amount of 5 to 90 wt % based on the coating layer B when the member is a siloxane copolymerized polyester resin or 1 to 50 wt % based on the coating layer B when the member is other than the siloxane copolymerized polyester resin, and the peel strength between the base film C and the coating layer B being 15 g/10 cm or less.

6. The composite polyester film of claim 5, wherein the binder resin contained in the coating layer B is at least one water-soluble or water-dispersible resin selected from the group consisting of water-soluble or water-dispersible acrylic resins, polyester resins and acryl-polyester resins.

7. The composite polyester film of claim 5, wherein the content of the inert particles contained in the coating layer B is 0.5 to 30 wt %.

8. The composite polyester film of claim 5, wherein large protrusions having a height of 4 nm or more are existent on the outer surface of the coating layer B at a maximum density of $200/mm^2$.

9. A base film for a magnetic recording medium, which comprises the composite polyester film of claim 5.

10. A magnetic recording medium comprising the composite polyester film of claim 5 and a magnetic recording layer on the outer surface of the coating layer B of the composite polyester film.

11. A composite polyester film comprising:

(1) a base film C of an aromatic polyester which does not contain inert particles or contains inert particles having an average particle diameter of 5 to 2,000 nm in an amount of 0.001 to 5.0 wt % based on the aromatic polyester;

(2) a coating layer A on one side of the base film C, which comprises a binder resin, inert particles having an average particle diameter of 5 to 200 nm, a non-ionic surfactant and a siloxane copolymerized acrylic resin, the outer surface of the coating layer A having a centerline average roughness $Ra^A$ of 1 to 20 nm and being not a surface for forming a magnetic layer thereon, and the inert particles are contained in an amount of 5 to 40 wt % based on the coating layer A, the siloxane copolymerized acrylic resin being contained in an amount of 1 to 50 wt % based on the coating layer A and the non-ionic surfactant is contained in an amount of 5 to 40 wt % based on the coating layer A; and (3) a coating layer B on the other side of the base film C where the coating layer A is not existent, which comprises a binder resin, inert particles having an average particle diameter of 5 to 100 nm and an agglomeration rate of 20% or less, a non-ionic surfactant, and one member selected from the group consisting of a siloxane copolymerized polyester resin, siloxane copolymerized acrylic resin, silicone and wax, the outer surface of the coating layer B having a protrusion density of 1 to 100/$\mu$m$^2$ and a centerline average roughness Ra$^B$ of 0.1 to 2 nm and being a surface for forming a magnetic layer thereon, the non-ionic surfactant being contained in an amount of 10 to 50 wt % based on the coating layer B and the above member being contained in an amount of 5 to 90 wt % based on the coating layer B when the member is a siloxane copolymerized polyester resin or 1 to 50 wt % based on the coating layer B when the member is other than the siloxane copolymerized polyester resin, and the peel strength between the base film C and the coating layer B being 15 g/10 cm or less.

12. A base film for a magnetic recording medium, which comprises the composite polyester film of claim 11.

13. A magnetic recording medium comprising the composite polyester film of claim 11 and a magnetic recording layer on the outer surface of the coating layer B of the composite polyester film.

* * * * *